(12) United States Patent  (10) Patent No.: US 8,509,254 B2
Nemiroff et al.  (45) Date of Patent: Aug. 13, 2013

(54) DIRECT MEMORY ACCESS ENGINE PHYSICAL MEMORY DESCRIPTORS FOR MULTI-MEDIA DEMULTIPLEXING OPERATIONS

(75) Inventors: Daniel Nemiroff, El Dorado Hills, CA (US); Balaji Vembu, Folsom, CA (US); Raul Gutierrez, El Dorado Hills, CA (US); Suryaprasad Kareenahalli, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 12/824,300

(22) Filed: Jun. 28, 2010

(65) Prior Publication Data

US 2011/0320777 A1 Dec. 29, 2011

(51) Int. Cl.
*G06F 12/00* (2006.01)

(52) U.S. Cl.
USPC .......... 370/412; 370/429; 370/535; 712/216; 711/110; 711/169

(58) Field of Classification Search
None
See application file for complete search history.

(56) References Cited

U.S. PATENT DOCUMENTS

| | | | |
|---|---|---|---|
| 6,184,906 B1 * | 2/2001 | Wang et al. | 345/532 |
| 6,462,743 B1 | 10/2002 | Battle | |
| 6,499,123 B1 * | 12/2002 | McFarland et al. | 714/724 |
| 7,669,082 B2 | 2/2010 | Barde et al. | |
| 8,194,690 B1 * | 6/2012 | Steele et al. | 370/412 |
| 2005/0232462 A1 | 10/2005 | Vallone et al. | |
| 2010/0142920 A1 | 6/2010 | Lockett et al. | |
| 2011/0055838 A1 * | 3/2011 | Moyes | 718/102 |
| 2011/0066811 A1 * | 3/2011 | Sander et al. | 711/137 |

OTHER PUBLICATIONS

Int'l Search Report and Written Opinion for Int'l Patent Application No. PCT/US2011/041987 mailed Feb. 20, 2012, 10 pgs.

* cited by examiner

*Primary Examiner* — Chi Pham
*Assistant Examiner* — Shick Hom
(74) *Attorney, Agent, or Firm* — Blakely, Sokoloff, Taylor & Zafman LLP

(57) ABSTRACT

The architecture and techniques described herein can improve system performance with respect to the following. Communication between two interdependent hardware engines, that are part of pipeline, such that the engines are synchronized to consume resources when the engines are done with the work. Reduction of the role of software/firmware from feeding each stage of the hardware pipeline when the previous stage of the pipeline has completed. Reduction in the memory allocation for software-initialized hardware descriptors to improve performance by reducing pipeline stalls due to software interaction.

18 Claims, 4 Drawing Sheets

DIRECT MEMORY ACCESS ENGINE PHYSICAL MEMORY DESCRIPTORS FOR MULTI-MEDIA DEMULTIPLEXING OPERATIONS

TECHNICAL FIELD

Embodiments of the invention relate to data stream management. More particularly, embodiments of the invention relate to management of a stream of multi-media data and reduction of an associated memory footprint.

BACKGROUND

Media processing is typically implemented through a multi-stage pipeline. Each stage processes a large amount of data and outputs the data into memory for the next stage to consume. Pipeline stages are controlled and synchronized using software or firmware. This works for stages with large and predictable latencies. This is very inefficient when pipeline stage latencies vary unpredictably.

Having an external synchronizing agent to deal with the variable latencies can impose a large overhead. For good user experience, the data processing rate generally should sustain 40-160 Mbps rate with minimal latency variation to avoid skipped movie frames.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
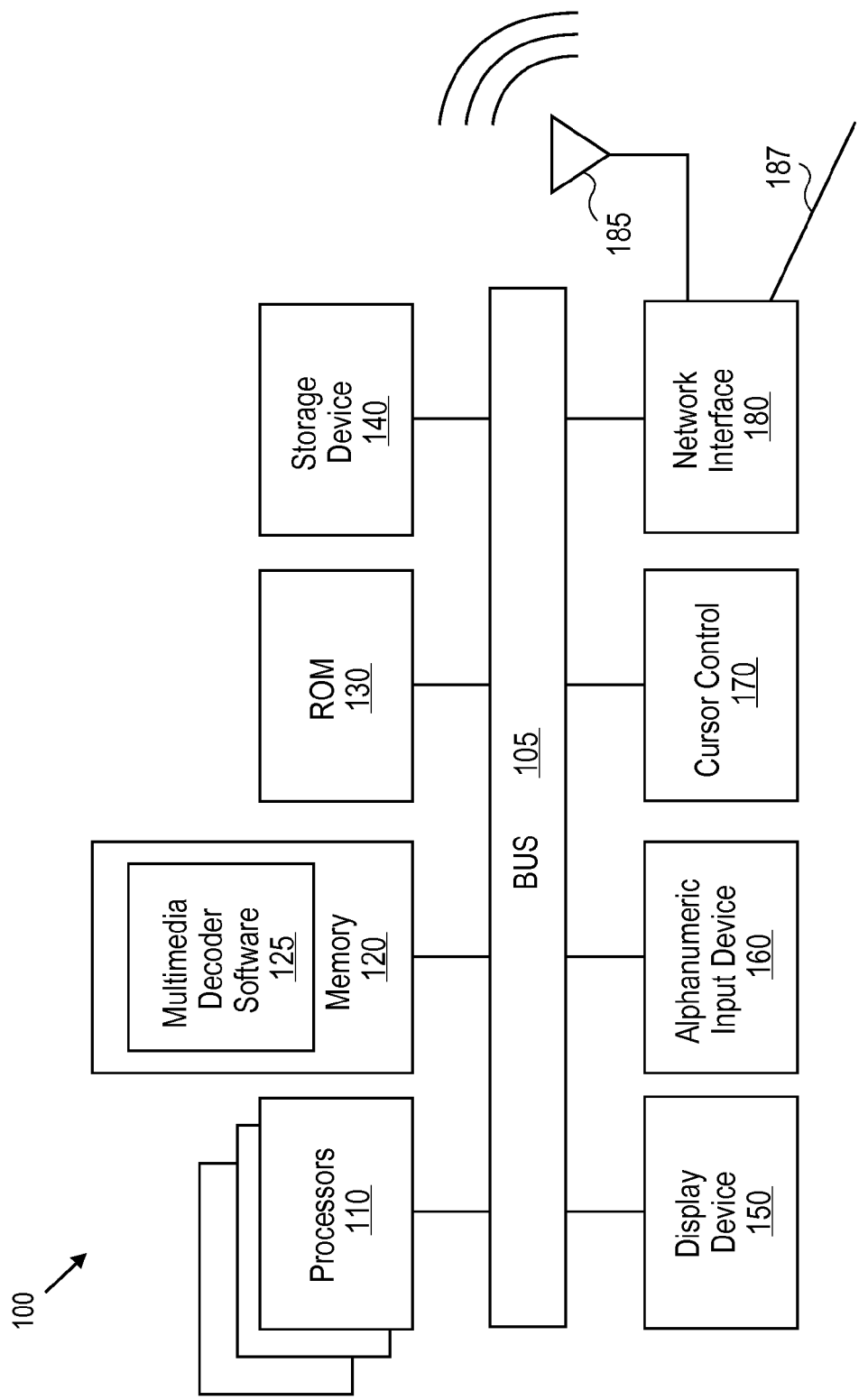
FIG. 1 is a block diagram of one embodiment of an electronic system.

In the following description, numerous specific details are set forth. However, embodiments of the invention may be practiced without these specific details. In other instances, well-known circuits, structures and techniques have not been shown in detail in order not to obscure the understanding of this description.

The architecture and techniques described herein can improve system performance with respect to the following. Communication between two interdependent hardware engines, that are part of pipeline, such that the engines are synchronized to consume resources when the engines are done with the work. Reduction of the role of software/firmware from feeding each stage of the hardware pipeline when the previous stage of the pipeline has completed. Reduction in the memory allocation for software-initialized hardware descriptors to improve performance by reducing pipeline stalls due to software interaction.

In various embodiments described herein a hardware, three-engine architecture is arranged in a three-stage pipeline. An Input Engine that copies input data from a described location in a system and produces descriptors for the processing engine. In one embodiment, the input engine may perform decryption of content. A Processing Engine that processes the input and prepares descriptors for the Output Engine. In one embodiment, the processing engine parses the stream and identifies segments of data to be sent to different agents. The Output Engine outputs data to the described location in the system. In one embodiment, the output engine writes output data targeted for different recipients and may encrypt the data on the fly.

In one embodiment, each stage communicates with the next stage through a circular buffer (CB) in memory. In one embodiment, data is delivered to the pipeline in 6-kB granularity; however, other pipeline granularity can also be supported. In one embodiment, each stage will begin consuming a unit of work from its input buffer only when there is space available in its output buffer. The variable latency of each stage implies that each stage must write its output to memory and the next stage will consume its data from memory.

Mechanisms described herein allow each of these engines to communicate with the other components and throttle the stages, if necessary. For example, multi-media software may set up the stages at the beginning of an operation by allocation the memory structures for inter-stage communication and point each stage to the appropriate buffer to use for input and output. The multi-media software may then write an indicator (e.g., a bit) in each stage enabling the auto-pipelining operation. After this point, the mufti-media software does not need to manage the pipeline stages. Each stage will monitor its input buffer for workload submission and then determine whether it should process the newly submitted packets based on its output buffer state (full or has space).

In one embodiment, the Input Engine does not process a descriptor if the next stage Processing Engine buffer is full. This is to prevent the Input Engine from updating a buffer currently in use by any of the next stages as well as overflowing the next stage's write pointer.

Previously, when two engines that communicate through memory need to be synchronized, software is utilized to synchronize the engines. In the example above, a software driver for the hardware would service an interrupt for the Output Engine and the software driver would set up a new descriptor for the Input Engine, re-using the buffer that the Output Engine has just copied data from. This previous mechanism requires software to schedule an interrupt when it has run out of working buffers. The mechanisms described herein allow the buffers to be reused such that the software can schedule interrupts to occur as infrequent as necessary.

In one embodiment, a tag in each engine's descriptor associates the engine with a software allocated memory buffer. In one embodiment, when an engine is ready to process a new descriptor the engine checks to see if the memory buffer associated with the tag is being used by any of the other engines. If so, the engine stalls until the memory buffer is no longer used by any other engines. In one embodiment, the tag is software programmable such that software can allocate any number of buffers. However, because the pipeline auto-starts allocating three buffers (in this example) improved performance is achieved. This allows for real-time processing of large quantities of multi-media data with minimal software-related scheduling delays for managing the processing pipeline.

FIG. 1 is a block diagram of one embodiment of an electronic system. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

These electronic systems may function to provide decoding of multimedia data as described herein. The decoded multimedia data may be provided to a user of the electronic system via input/output (I/O) systems such as audio speakers, display devices, tactile feedback, etc.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as memory), coupled to bus 105 and may store information and instructions that may be executed by processor 110. Memory 120 may also be used to store temporary variables or other intermediate information during execution of instructions by processor 110.

Memory 120 may include multimedia decoder software 125 that manages the decoding of multimedia data that may be stored, for example, in memory 120 or the multimedia data may be provided from a recordable media such as a compact disc, DVD, network connection, etc.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Figure 2:
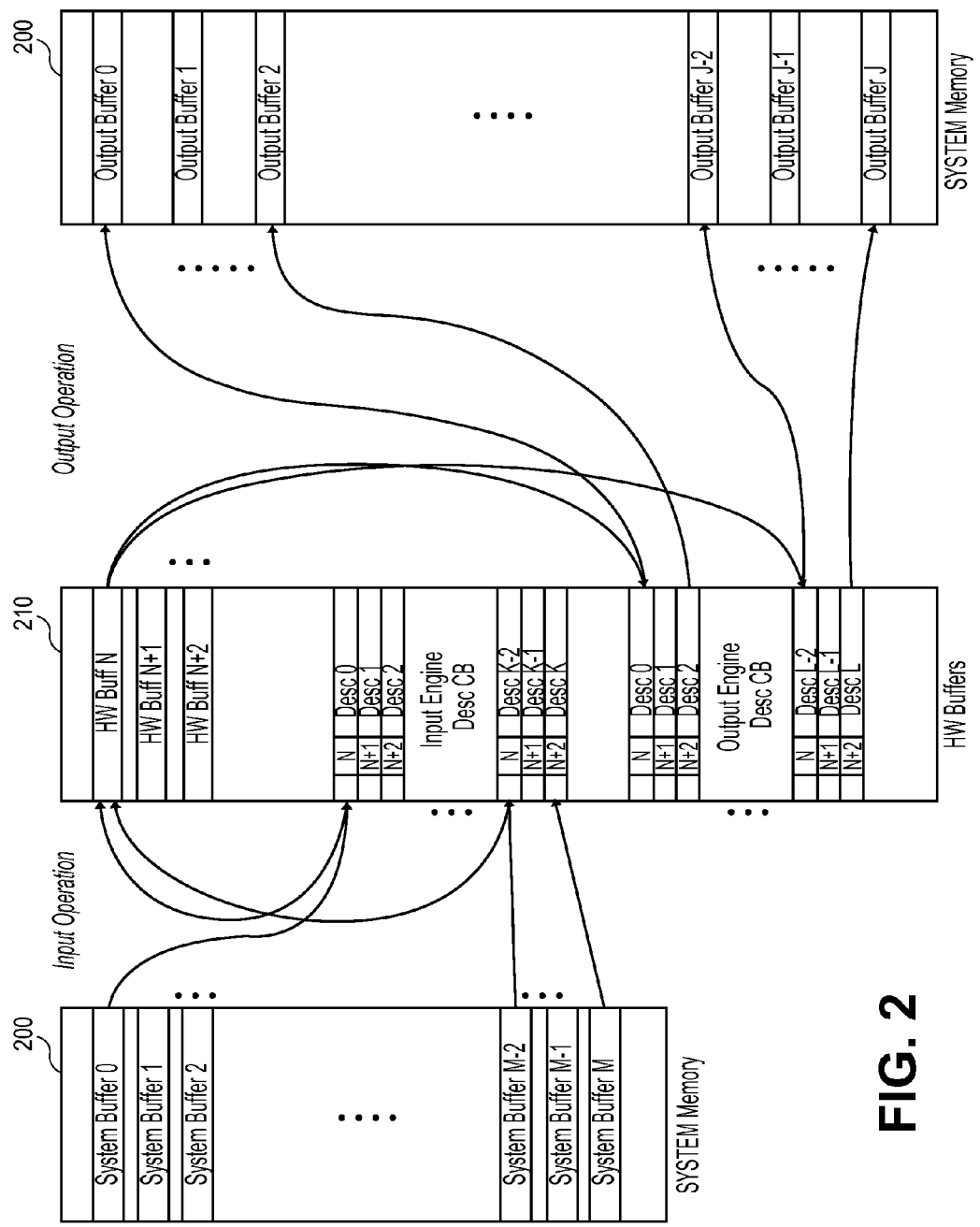
FIG. 2 is a conceptual diagram of an interaction between buffers in memory and hardware buffers that may be utilized to support automatic pipelining as described herein.

FIG. 2 is a conceptual diagram of an interaction between buffers in memory and hardware buffers that may be utilized to support automatic pipelining as described herein. In one embodiment, multiple system buffers and multiple output buffers are provided by a system memory (e.g., memory 120 in FIG. 1); however, in alternate embodiments, the buffer functionality may be provided in another manner. In one embodiment, the buffers are hardware buffers that are communicatively coupled with the memory.

The example of FIG. 2 illustrates one embodiment of a technique to share and reuse the buffers in multiple descriptors. In the example of FIG. 2, the input and output engines both have K descriptors. In one embodiment, three hardware buffers (N, N+1 and N+2) are assigned to the K descriptors. In this case HW Buffer N could be used by the Output Engine in its Descriptor L−2 or Descriptor 2.

In the example of FIG. 2, system memory 200 includes both system buffers and output buffers. Hardware buffers 210 may be in a system component other than the system memory and includes multiple hardware buffers to be used by the engines described herein. The system buffers (e.g., System Buffer 0, System Buffer 1, System Buffer 2, . . . , System Buffer M−2, System Buffer M−1, System Buffer M) point to corresponding descriptors for the Input Engine. For example, System Buffer 0 points to Descriptor 0, System Buffer M−2 points to Descriptor K−2, System Buffer M points to Descriptor K, etc.

The multiple descriptors corresponding to the multiple System Buffers can be utilized to share Hardware (HW) Buffers. In the example of FIG. 2, the descriptors for the Input Engine (e.g., Descriptor 0, Descriptor K−2, Descriptor K). The Input Engine descriptors are mapped to corresponding Hardware Buffers (e.g., HW Buffer N, HW Buffer N+1, HW Buffer N=2), which are in turn mapped to corresponding Output Engine descriptors.

Thus, System Buffers are mapped to Input Engine descriptors, to HW Buffers and to Output Engine descriptors. This allows for sharing and reuse of descriptors and buffers. The Output Engine descriptors (e.g., Descriptor 0, Descriptor L−2) provide a further mapping to one or more Output Buffers (e.g., Output Buffer 0, Output Buffer 2, Output Buffer J−2, Output Buffer J) in system memory 200.

In one embodiment, the Input Engine must not process a descriptor if there are no free buffer entries in SRAM. The buffer entry availability is tracked by the Input Engine as a storage structure which requires free entries to be available before loading it. For example, the Input Engine has finished processing descriptor K using buffer N+3, t total of four buffers exist (N, N+1 . . . N+3), the Output Engine is processing a descriptor for pack K−3 which is stored in buffer N, the Input Engine is does not process the next descriptor until the Output Engine completes descriptor for pack K−3 since it is stored in buffer N which descriptor K+1 will be copied into.

The following stall condition detection may be utilized:
In_indx_adj[X:0]=Descriptor_ind[X:0]+Cushion Stall processing when buffer FIFO is effectively full::
In_indx_adj[X-1:0]=Out_indx[X-1:0] AND In_indx_adj[X]!=Out_indx[X]

The cushion allows for a programmable N-free minimum requirement for Input Engine processing where the default is, for example, 1.

A multi-media stream typically has three basic components: navigation data, video data and audio data. A device processing a multi-media stream must de-multiplex these different data elements, sending video data to the video adapter, audio data to the audio adapter and navigation data to the software mixing the audio and video data. In certain security scenarios, the video/audio data might have to be isolated from the navigation data using different encryption (e.g., using different keys).

When integrating multi-media processing into hardware, various embodiments of the techniques described herein may solve the following problems: how to minimize the memory footprint during the demultiplexing in order to avoid a number of intermediate buffers, how to describe a 1:N relationship of a single source address (the original media stream) to N destination addresses (the video, audio, and application buffer), how to tag the demultiplexing information such that a direct memory access (DMA) engine can determine what portions of the source stream to send to which media engine, and/or when encrypting data, how to synchronize Advanced Encryption Standard counter (AES-CTR) mode counters.

In various embodiments, these solutions may be provided by direct memory access (DMA) engine that supports multiple PRD types such that source and destination can be defined separately from the demultiplexing information, the actual PRD structures themselves, and software that programs the PRDs.

In one embodiment, because there are multiple pieces of information presented to the DMA controller, the PRD structures are divided into multiple types. Source-Destination PRD: The SRC-DEST PRD can specify the single source address or multiple destination addresses. For a single transaction SW submits a single SRC-PRD and multiple DEST-PRDs. These PRDs can be setup during initialization time to optimize runtime performance.

DeMux PRD: The DeMux PRDs marks portions of the input stream as a specific media type such as audio or video data. SW submits DeMux PRDs to the HW as it determines where boundaries between the media segments are. In one embodiment, to simplify the inserting of SRC-DEST PRDs at initialization and DeMux PRDs during runtime the HW contains a separate circular buffer for each PRD type.

Currently, multi-media processing is either being done in one of two ways in software with no hardware support or in hardware, where the decryption, demultiplexing, and decode is completed in a discrete component. In the software mode the software submits the individual media streams by the use of memory copies and double buffering. In the hardware mode, no DMA described in this invention is required.

The techniques described herein may separate the traditional source and destination addresses from the demultiplexing information. This allows the source and destinations to be fixed by software such that time consuming scatter gather and virtual to physical address translation needs to only occur at initialization time. In addition, the separating out of the demultiplexing information allows the DMA engine to support multiple media types. For example, in addition to simple audio and video this invention can be scaled to $2^{nd}$ and $3^{rd}$ video streams (such as would be used for picture-in-picture).

For the techniques described herein, the concept of a 1:N relationship between source and destination is unique. In addition, the separating out of the demultiplexing information into separate PRDs from the source and destination PRDs is also unique.

Figure 3:
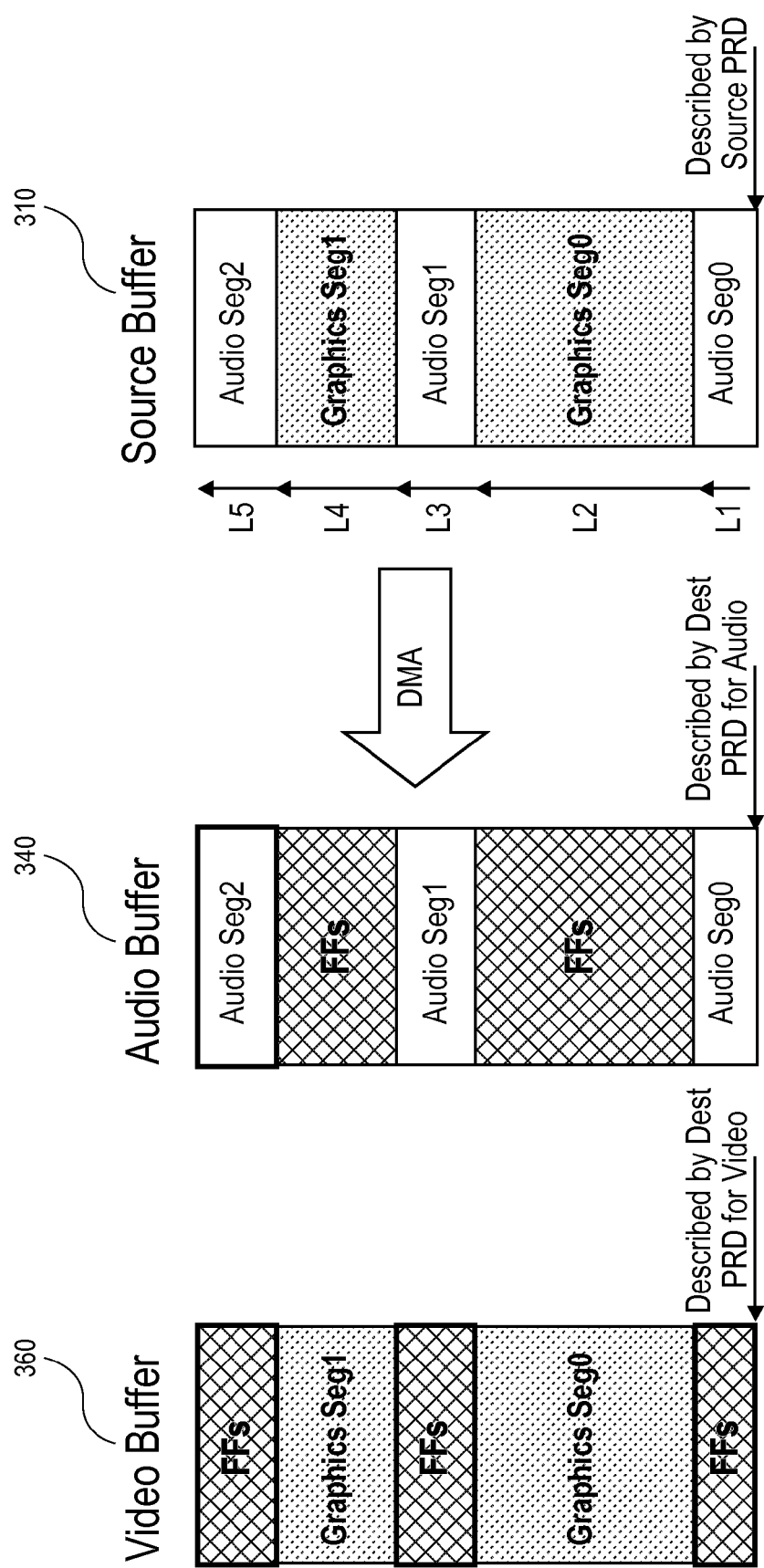
FIG. 3 is an example illustration of a source buffer with two media types: video and audio data.

FIG. 3 is an example illustration of a source buffer with two media types: video and audio data. In one embodiment, a single source buffer, two destination buffers and description of the segments which define the audio and video portions of the stream may be utilized. Once defined, the DMA engine can successfully transfer the correct data to its respective destination buffers.

In the example of FIG. 3, source buffer 310 includes both audio segments (e.g., Audio Seg0, Audio Seg1, Audio Seg2) and graphics segments (e.g., Graphics Seg0, Graphics Seg1). Each segment has a known length as indicated by L1, L2, L3, L4, L5, etc. DMA engines may be utilized to transfer audio segments from source buffer 310 to audio buffer 340 utilizing descriptors as described above. Similarly, DMA engines may be utilized to transfer graphics segments from source buffer 310 to video buffer 360 utilizing descriptors as described above.

In one embodiment, because the destination buffers are aligned to the same boundaries as the source buffers, the DMA engine fills in, for example, 0xFF where data is skipped. In one embodiment a descriptor is utilized to indicate what a value of zero means and/or what value to be used as a filler, for example, 0xFF. A counter management descriptor may also be utilized. The following tables illustrate example embodiments of suitable PRD structures:

| Variable | Width (bits) | Description |
| --- | --- | --- |
| PRD Type Encoding | 4 | Indicates PRD type |
| Buffer Type | 3 | Valid bit + 2 bits encoding Example Encoding: 00 - Source 01 - Application 10 - Video 11 - Audio |
| Buffer Base Address | 36 | |

Example SRC-DEST PRD

| Variable | Width (bits) | Description |
| --- | --- | --- |
| PRD Type Encoding | 4 | Indicates PRD type |
| Destination Select | 2 | Example Encoding: 00 - Application 01 - Audio 10 - Main Video 11 - Sub Video |
| Transfer Length | 8 | Amount of data to transfer to the specified media engine in Destination Select |

Example Demultiplex PRD

In alternate embodiments, different and/or additional PRD types and structures may also be supported.

Thus, the techniques described herein allow for separation of source and destination addresses from the demultiplexing information. This allows the source and destinations to be fixed by software such that time-consuming scattering and gathering, and virtual-to-physical address translations can occur less frequently, for example, only at initialization time. Further, the separation of the demultiplexing information allows for a DMA engine to support multiple media types. For example, in addition to simple audio and video support, the techniques described herein can be scaled to multiple video streams. This may be useful, for example, to support picture-in-picture playback.

Figure 4:
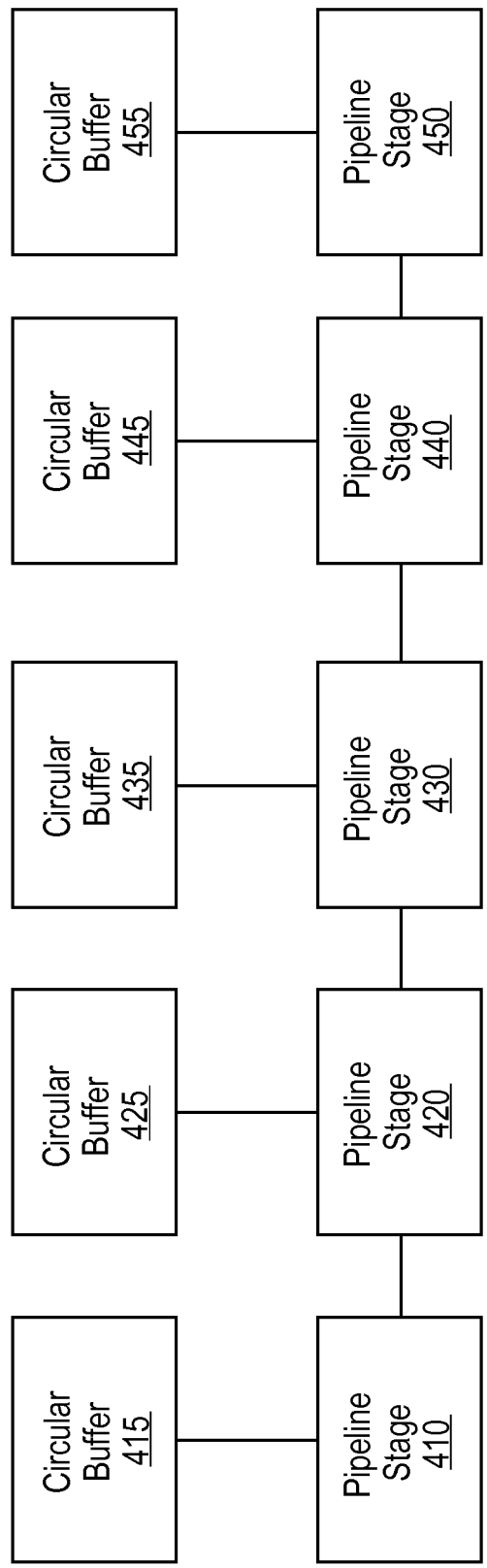
FIG. 4 is a block diagram of one embodiment of a multi-media-processing pipeline utilizing circular buffers.

FIG. 4 is a block diagram of one embodiment of a multi-media-processing pipeline utilizing circular buffers. In one embodiment, each pipeline stage engine (e.g., 410, 420, 430, 440, 450) has an associated circular buffer (e.g., 415, 425, 435, 445, 455) and descriptors are utilized as described above for the engines to find work to do. By comparison, previous approaches utilized auto-incrementation to find work. The example of FIG. 4 includes five pipeline stages; however, any number of pipeline stages may be supported.

In one embodiment, one or more of the pipeline stages may be implemented as microcode that is executed by a processing element of the host system. Also, one or more of the pipeline stages may be dedicated hardware components designed to perform the function of the pipeline stage.

Utilization of the descriptors and techniques described herein allow one or more engines to route data to the correct controller. That is, the engine(s) may demultiplex the data in a secure manner so that the data is demultiplexed and sent to the correct controller. In one embodiment, encryption is performed separately for each data type. In one embodiment, the final pipeline stage is a DMA engine.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a plurality of multimedia processing pipeline stages comprising an input engine to copy input data from a described location in a system and produce descriptors, a processing engine to process the input data and prepare descriptors, and an output engine to output data to the described location in the system, each stage to consume a unit of work from its input buffer only when there is space available in its output buffer and each stage writes its output to memory and the next stage to consume its data from memory;
a plurality of circular buffers corresponding to the plurality of multimedia pipeline stages, wherein a pipeline stage stalls if the circular buffer of a subsequent stage is full, wherein descriptors utilized for passing data between buffers are re-used.

2. The apparatus of claim 1 wherein a final pipeline stage comprises a direct memory access (DMA) engine.

3. The apparatus of claim 1 wherein a first descriptor comprises a field for at least source, destination and type information.

4. The apparatus of claim 3, wherein the type information indicates whether the data to be processed in video, audio, or application data.

5. The apparatus of claim 3 wherein a second descriptor comprises a field indicating an encoding for corresponding data.

6. The apparatus of claim 5 wherein the encoding indicates application data, audio data, video data or sub-video data.

7. A method comprising:
identifying a stream of multimedia data to decode, the stream of multimedia data including at least segmented audio data, video data, and application data;
receiving the stream of multimedia data with a pipelined decoder mechanism having a plurality of processing pipeline stages comprising an input engine to copy input data from a described location in a system and produce descriptors, a processing engine to process the input data and prepare descriptors, and an output engine to output data to the described location in the system;
demultiplexing the stream of multimedia data with one or more of the pipeline stages, wherein a pipeline stage stalls if the circular buffer of a subsequent stage is full, wherein descriptors utilized for passing data between buffers are re-used and each stage writes its output to memory and the next stage to consume its data from memory; and
transmitting the demultiplexed multimedia segments to processing components for audio data, video data and application independently and securely.

8. The method of claim 7 wherein a final pipeline stage comprises a direct memory access (DMA) engine.

9. The method of claim 7 wherein a first descriptor comprises a field for at least source, destination and type information.

10. The method of claim 9, wherein the type information indicates whether the data to be processed in video, audio, or application data.

11. The method of claim 9 wherein a second descriptor comprises a field indicating an encoding for corresponding data.

12. The method of claim 11 wherein the encoding indicates application data, audio data, video data or sub-video data.

13. An article comprising a non-transitory computer-readable medium, the computer-readable medium having stored thereon instructions that, when executed by one or more processors, cause the one or more processors to:
identify a stream of multimedia data to decode, the stream of multimedia data including at least segmented audio data, video data, and application data;
receive the stream of multimedia data with a pipelined decoder mechanism having a plurality of processing pipeline stages comprising an input engine to copy input data from a described location in a system and produce descriptors, a processing engine to process the input data and prepare descriptors, and an output engine to output data to the described location in the system;
demultiplex the stream of multimedia data with one or more of the pipeline stages, wherein a pipeline stage stalls if the circular buffer of a subsequent stage is full, wherein descriptors utilized for passing data between buffers are re-used and each stage writes its output to memory and the next stage to consume its data from memory; and
transmit the demutliplexed multimedia segments to processing components for audio data, video data and application independently and securely.

14. The article of claim 13 wherein a final pipeline stage comprises a direct memory access (DMA) engine.

15. The article of claim 13 wherein a first descriptor comprises a field for at least source, destination and type information.

16. The article of claim 15, wherein the type information indicates whether the data to be processed in video, audio, or application data.

17. The article of claim 15 wherein a second descriptor comprises a field indicating an encoding for corresponding data.

18. The article of claim 17 wherein the encoding indicates application data, audio data, video data or sub-video data.

* * * * *